United States Patent [19]

Dube et al.

[11] Patent Number: 5,249,866
[45] Date of Patent: Oct. 5, 1993

[54] THERMAL PROPERTIES MEASUREMENT USING A SUPERCONDUCTOR SENSOR

[75] Inventors: William P. Dube, Denver; Loren F. Goodrich, Boulder; John M. Moreland, Louisville, all of Colo.

[73] Assignee: The United States of America as represented by the Secretary of Commerce, Washington, D.C.

[21] Appl. No.: 890,086

[22] Filed: May 29, 1992

[51] Int. Cl.$^5$ .............................................. G01K 7/14
[52] U.S. Cl. ................................... 374/176; 374/173; 374/163; 364/557; 505/700
[58] Field of Search .............. 374/16, 21, 27, 102, 374/103, 163, 171, 173, 176; 364/557, 483, 492; 505/700

[56] References Cited

U.S. PATENT DOCUMENTS

| | | | |
|---|---|---|---|
| 3,211,002 | 10/1965 | Franklin | 374/175 |
| 4,602,871 | 7/1986 | Hanaoka | 374/102 |
| 4,760,538 | 7/1988 | Bock et al. | 374/25 |
| 5,137,370 | 8/1992 | McCulloch | 364/557 X |

Primary Examiner—William A. Cuchlinski, Jr.
Assistant Examiner—G. Bradley Bennett
Attorney, Agent, or Firm—Thomas P. Pavelko

[57] ABSTRACT

A method for thermal environment sensing utilizing superconducting materials finds utility in the production of low power cryogenic flow meters, bolometers, level detectors and other types of thermal environment sensors. A device for determining the first and second derivatives (dV/dI and $d^2V/dI^2$) utilizes a ramped current until a set value of the first derivative (dV/dI) is achieved, the current supply being placed in a feedback mode to maintain the first derivative constant and monitoring any changes in the second derivative ($d^2V/dI^2$) which indicate changes in the thermal environment. Alternatively, the second derivative is maintained constant and the first derivative is measured. Any parameter which is indicative of the non-linearity of the relationship between the voltage and the current can be utilized instead of the second derivative.

10 Claims, 5 Drawing Sheets

1

THERMAL PROPERTIES MEASUREMENT USING A SUPERCONDUCTOR SENSOR

FIELD OF THE INVENTION

The present invention relates to a method for utilizing the dependence between the thermal properties of a superconductor sintered powder and the transition point from the superconducting state of the sintered powder to the normal, resistive state thereof. Specifically, the present invention relates to a method of determining the heat transfer and thermal properties of a superconducting material and to the use of such method for thermal measurements, such as low power cryogenic flow meters, bolometers, level detectors and other types of thermal environment sensors.

BACKGROUND OF THE INVENTION

When a superconducting specimen makes the transition from the superconducting state to the normal (resistive) state, ohmic heating begins to occur. This ohmic heating causes the temperature of the specimen and its immediate surroundings to rise. This small temperature rise influences the specimen to move farther into the normal state causing increased ohmic heating. Thus, the shape of the voltage versus current (V-I) curve of a superconductor is influenced by its thermal surroundings. See, for example, Martinelli et al., "Investigation of Cryogenic Stability and Reliability of Operation of $Nb_3Sn$ Coils in Helium Gas Environment" in Proceedings of the 1972 Applied Superconductivity Conference, Annapolis, Md., IEEE Publication No. 72CH0682-5-TABSC, pages 331–40 (1972), the entire disclosure of which is herein incorporated by reference.

The steepness of the voltage rise beyond the onset of flux flow is often represented by the power law relationship:

$$V = V_0(I/I_0)^n \quad (1)$$

wherein $V_0$ and $I_0$ are the voltage and current, respectively, just prior to the transition from the superconducting to the normal state. V is the voltage when measurement is taken. I is the corresponding current. The value of n can be determined from this relationship. Alternatively, n can be expressed by the following:

$$n = (I \cdot d^2V/dI^2)/(dV/dI) + 1 \quad (3)$$

For many superconductors, including high $T_c$ superconductors, n can be over 50. Clearly, n is strongly influenced by the thermal properties of the superconductor and the surrounding matrix material. In the extreme case of poor stabilization, however, the problem of thermal runaway can occur. In such instances, n is very large and the superconductor eventually vaporizes. Thus, conventional superconductor designs tend to minimize the dependance of n on the thermal surroundings.

It is known in the art to use superconductors as thermal sensors near $T_c$. See Hu et al., "Design analysis of high $T_c$ superconducting microbolometer", *Appl. Phys. Letter*, 55:2444 (1989), the entire disclosure of which is incorporated by reference. As the sensor absorbs heat, the resistance changes rapidly as the sample becomes completely normal. Alternatively, the sample can be biased near the critical state by adjusting the current flow at any temperature below $T_c$ (J=0). The problem in such methods is that for larger currents, thermal runaway can destroy the sensor as it goes normal. To avoid this problem, a feedback circuit controlling the current flowing through the sample can be used.

SUMMARY OF THE INVENTION

The present invention relates to a method of maximizing and utilizing the relationship between n and the thermal surroundings of a superconducting material, avoiding thermal runaway. The present invention further relates to a superconducting sensor for thermal measurements, as described above.

BRIEF DESCRIPTION OF THE DRAWINGS

FIG. 3a shows the results for a sample in liquid nitrogen, and FIG. 3b shows the results for a sample in vapor nitrogen.

FIG. 5a shows the results for a sample in liquid nitrogen, and FIG. 5b shows the results for a sample in vapor nitrogen.

DETAILED DESCRIPTION OF THE PRESENT INVENTION

Figure 1:
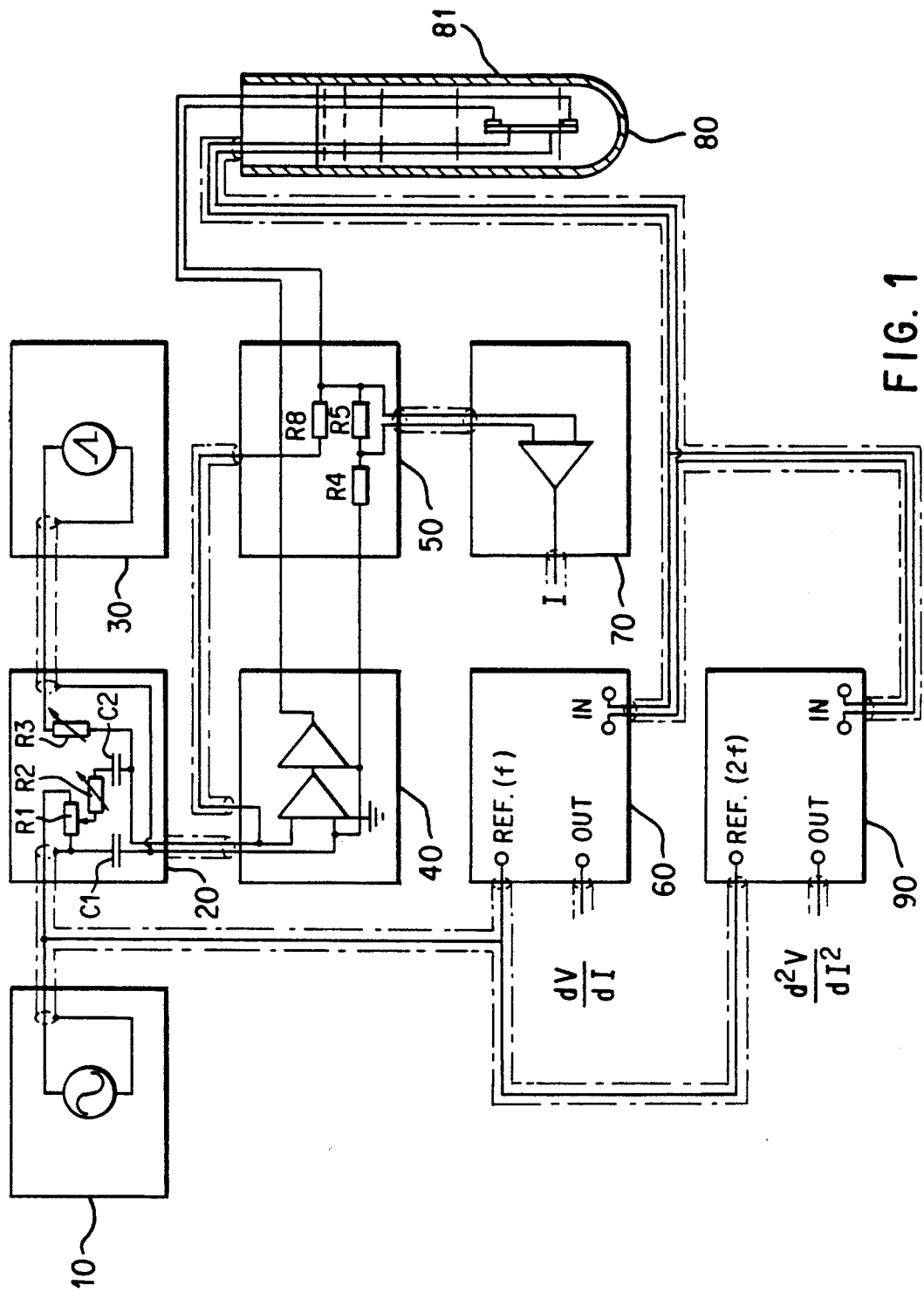
FIG. 1 is a circuit diagram of an apparatus of the present invention.

FIG. 1 is a schematic diagram of a device for measuring dV/dI and $d^2V/dI^2$ as a function of current. In FIG. 1, 10 is a reference oscillator. 20 is a resistor network current source in which R1, R2 and R3 are resistors and C1 and C2 are capacitors. 30 is a digital voltage ramp. 40 is a bipolar operational power supply (BOP) configured for a current stabilized operation. 50 is a resistor box in which R4 is a precision power resistor for current sensing the BOP output, R5 is a calibrated high-current measuring resistor for determining sample current and R6 is a precision resistor for feedback stabilization of the BOP current output. 60 is a lock-in amplifier for detecting the fundamental voltage response, dV/dI, of the sample. 70 is a low noise preamplifier with a low pass filter ($f_c = 10$ Hz) on the output. 80 is a standard sample cryostat. 90 is a lock-in amplifier for detecting the second harmonic voltage, $d^2V/dI^2$, of the sample. Typical values are R1=10 k$\Omega$, R2=1M$\Omega$, R3=15 k$\Omega$, R4=0 $\Omega$ for low sample resistance below 100$\Omega$ or R4=25$\Omega$ for high sample resistance above 100$\Omega$, R5=90.0 m$\Omega$, R6=1 k$\Omega$, $V_{OSC}=1$ V rms and $f_{OSC}=37$ Hz.

If the sample employed has a non-linear voltage response depending on the dc current level, then, according to the theory for modulation derivatives, a small sinusoidal modulating current signal applied to the sample generates a voltage response as follows:

$$V(I,t) = V(I) + (dV/dI)I_{mod}\cos\omega t +$$
$$\tfrac{1}{2}(d^2V/dI^2)(I_{mod})^2\cos^2\omega t + \ldots$$
$$= V(I) + (dV/dI)I_{mod}\cos\omega t +$$
$$\tfrac{1}{4}(d^2V/dI^2)(I_{mod})^2(1 + \cos 2\omega t) + \ldots \quad (2)$$

As is clear from this equation, the first harmonic voltage is proportional to the dynamic resistance, $dV/dI$, and the second harmonic voltage is proportional to $d^2V/dI^2$. Thus, the value of the sinusoidal modulating current signal can be utilized in the determination and maximization of n.

As can be seen from FIG. 1, the current flowing through the sample is supplied by the BOP 40, which is operated in a current stabilized mode. The current input into the BOP 40 comes from a resistor network 20 that combines an oscillating current with a ramping current. Both the ac and ramp currents are independently adjusted. The ramp current is digitally programmed to allow for pause and reverse capability during the ramp. The ac voltage drop along the sample is measured using two lock-in amplifiers, 60 and 90, for measuring the first and second harmonics to determine $dV/dI$ and $d^2V/dI^2$. The dc current flowing through the sample is measured with a calibrated resistor R5 within resister box 50 and a low-noise pre-amplifier 70 with a low pass filter on its output.

A sample is, for example, a superconducting $YBa_2Cu_3O_x$ (YBCO) sintered powder. As is known in the art, this indicates a specific type of semiconductor, in which the oxygen content is not fixed. Therefore, no values for x are necessary for one skilled in the art to understand what is meant by this expression. The sample, thermometers and heater are located in the vapor space trapped by the Dewar 81. A fiberglass-epoxy end plug fits snugly into the bottom of the Dewar 81. The end plug inhibits convection and liquid boiling which may cause thermal instabilities in the vapor space, yet allows an exchange of gas between the vapor space and the surrounding liquid nitrogen. The inverted Dewar 81 can be lifted away from the sample space so that the sample is in direct contact with the liquid nitrogen. By pressuring the liquid nitrogen, it is possible to raise the temperature of the sample several degrees above its normal boiling point of 76K, allowing for comparison of the transport properties of the sample in both liquid and vapor at the same temperature.

The YBCO starting powder can be made from "123" stoichiometric mixtures of $Y_2O_3$, $BaCO_3$ and $CuO$, which are ground together and calcined at 930° C. in air for ten hours. The resulting powder was reground and annealed at 600° C. for ten hours and cooled at a rate of 2.4° C./min to 450° C. in oxygen. The powder was pressed into 1.9 cm diameter pellets at a pressure of 20 MPa. The pellets were sintered at 900° C. for ten hours in oxygen and slowly cooled at 2.4° C./min. The pellet densities were 60% of the theoretical density determined by x-ray diffraction to be 6.7 g/cm³. The pellet was then cut into $10 \times 1 \times 1$ mm³ bars for transport measurements. Contacts to the bars were made by evaporating four 2 μm thick Ag (99.99%) pads in line along the sample with a 5 mm voltage tap separation. The contacts were annealed in flowing oxygen at 550° C. for 1 hour. Samples having contact resistance of less than 1 mΩ are produced, thus minimizing the effect of contact heating in the measurements.

The sample is maintained in a bathysphere cryostat 80, as described in Moreland et al., "Cryogenic Bathysphace for Rapid Variable Temperature Characterization of High $T_c$ Superconductors", Rev. Sci. Instrum., 59:2535 (1988), the entire disclosure of which is incorporated by reference. The essential feature of the bathysphere cryostat 80 is an inverted stainless steel double-walled Dewar 81 that insulates the vapor space from the surrounding fluid, in this case, liquid nitrogen.

Figure 2:
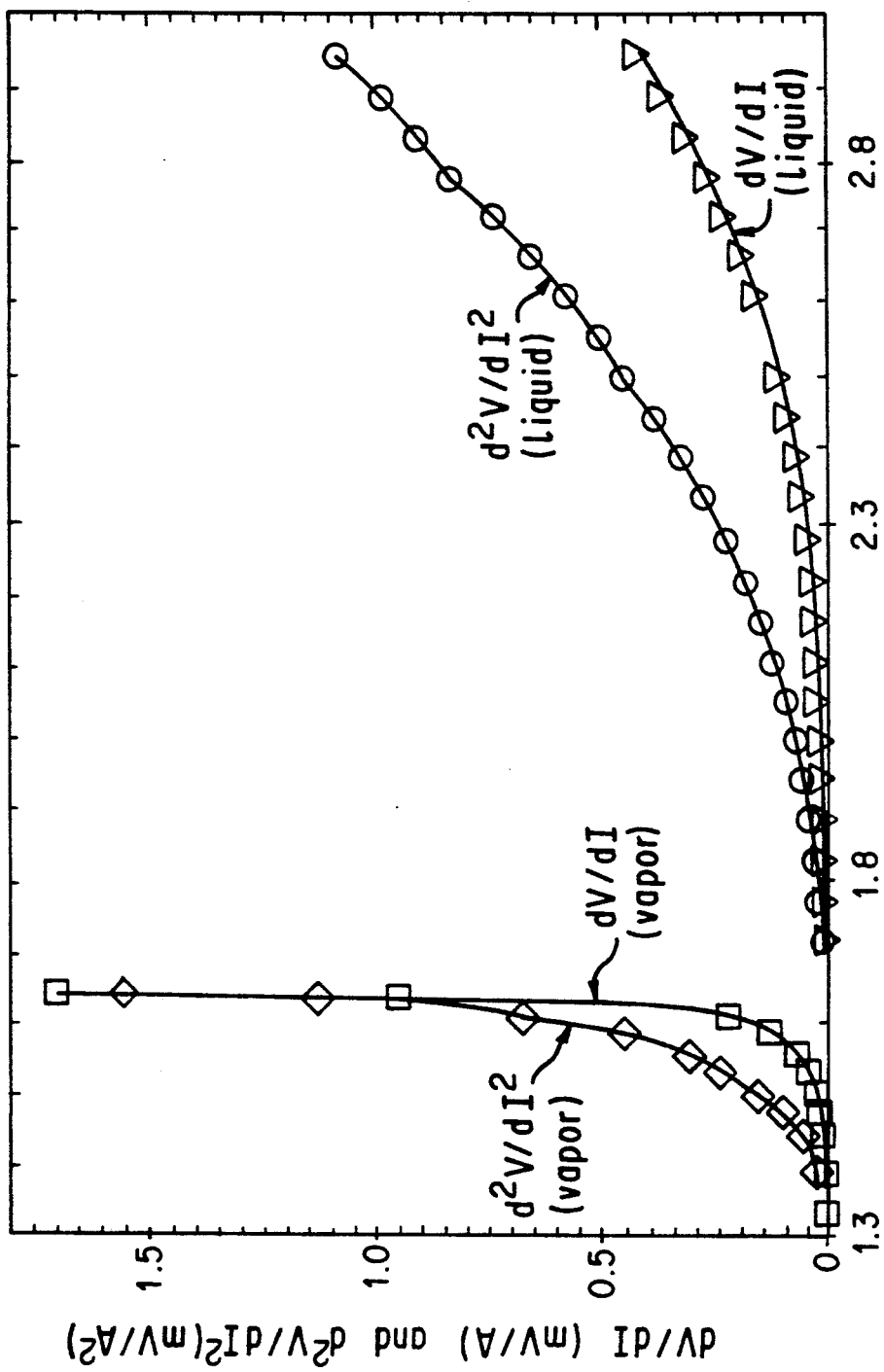
FIG. 2 is a plot of dV/dI and $d^2V/dI^2$ as a function of sample current in liquid versus vapor nitrogen at 81K.

The results of such example are shown in FIGS. 2 to 6. FIG. 2 shows the data when $dV/dI$ and $d^2V/dI^2$, measured by lock-in amplifiers 60 and 90, respectively, in FIG. 1, are plotted as a function of current flowing through a sample in liquid or vapor nitrogen at 81K. It is clear from the apparent increased critical current and decreased curvature that liquid nitrogen stabilizes the YBCO sample nearer to the superconducting temperature than does vapor nitrogen. The critical current, using a 40 μΩ $dV/dI$ criterion, changed from 1.5 amps (A) in vapor to 2.3 A in liquid.

Figure 3A:
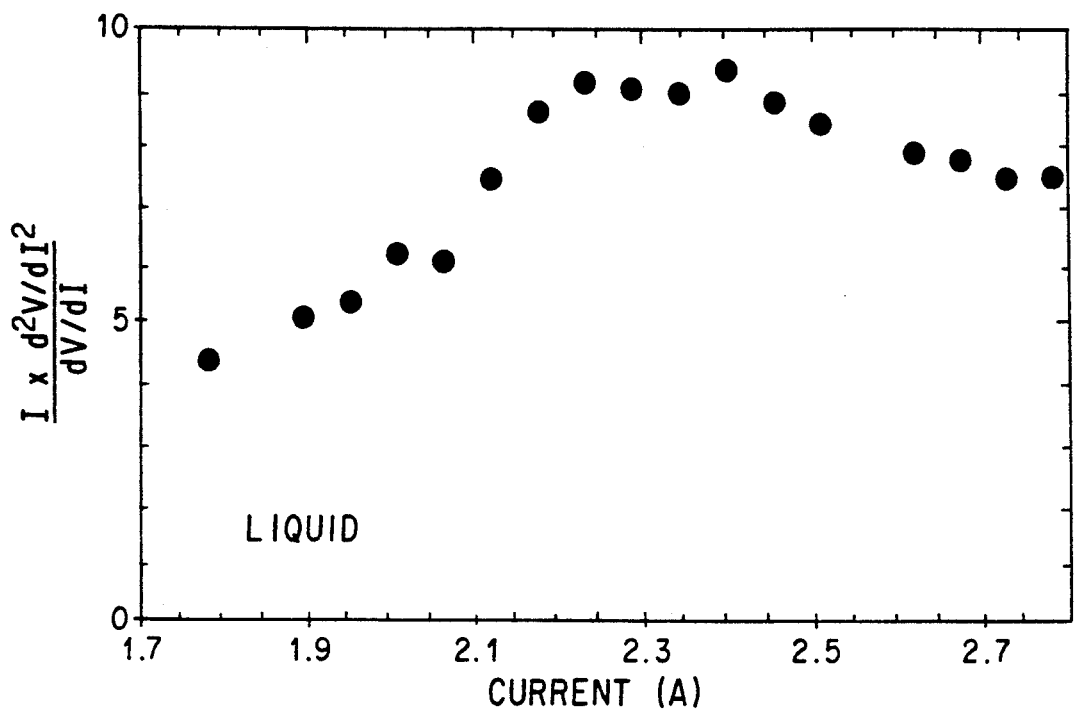
FIGS. 3a and 3b are plots of $(I \times d^2V/dI^2/(dV/dI))$ of the present invention as a function of sample current.
Figure 3B:
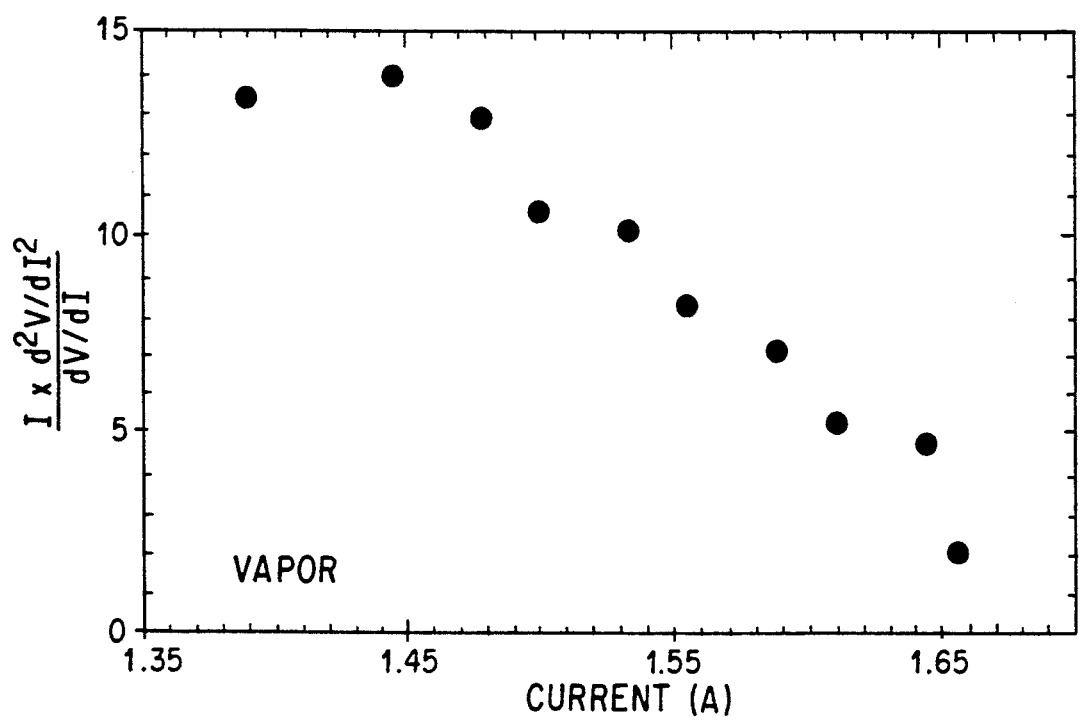

When n, as defined by Formula 3 above, is estimated as a function of I, the results are as shown in FIGS. 3a and 3b. From these figures, it is clear that n is roughly constant at lower currents near the onset of flux flow, being near 15 in vapor and 6 in liquid.

Figure 4:
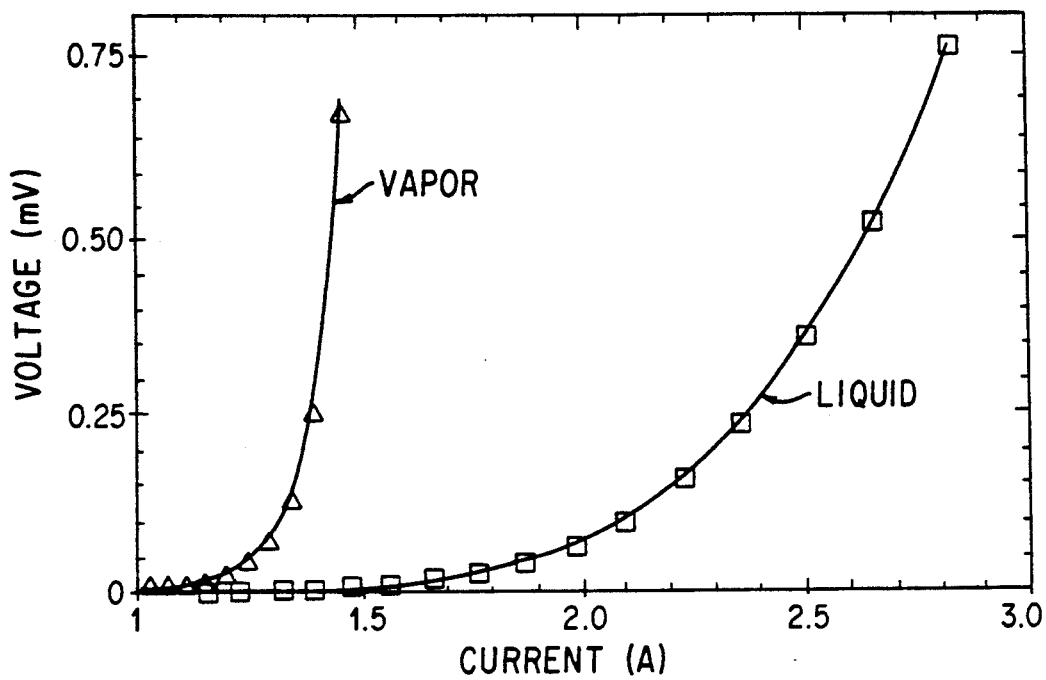
FIG. 4 is a plot of the dc voltage employed in the present invention as a function of sample current in liquid versus vapor nitrogen at 81K.
Figure 6:
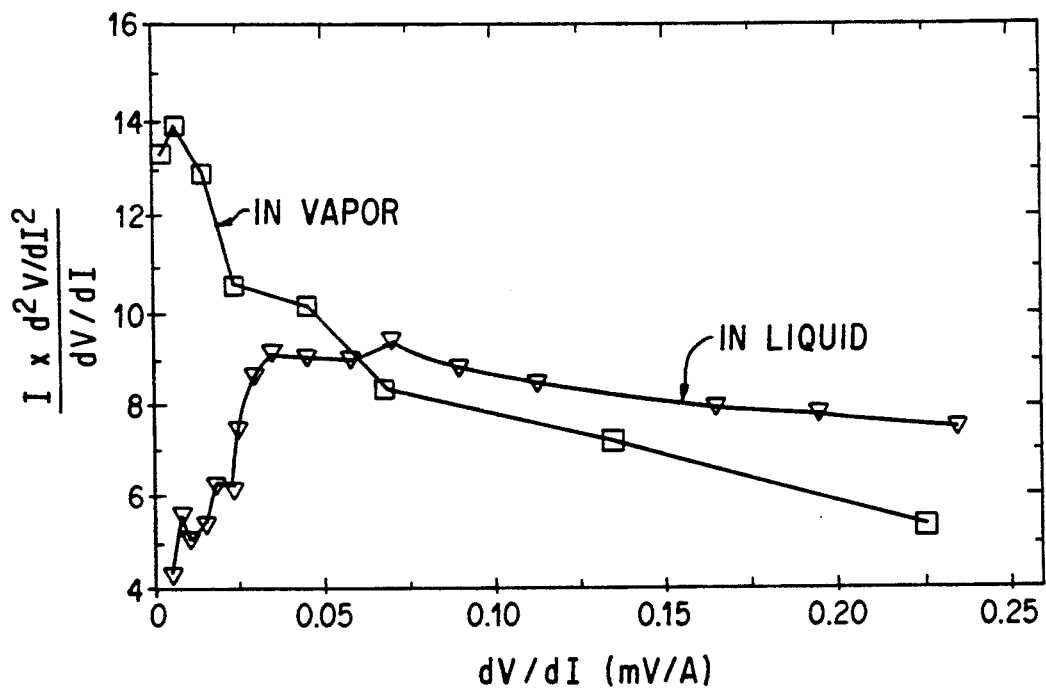
FIG. 6 is a plot of $(I \times d^2V/dI^2/(dV/dI))$ of the present invention as a function of sample dynamic resistance, dV/dI, in liquid versus vapor nitrogen at 81K.
Figure 5A:
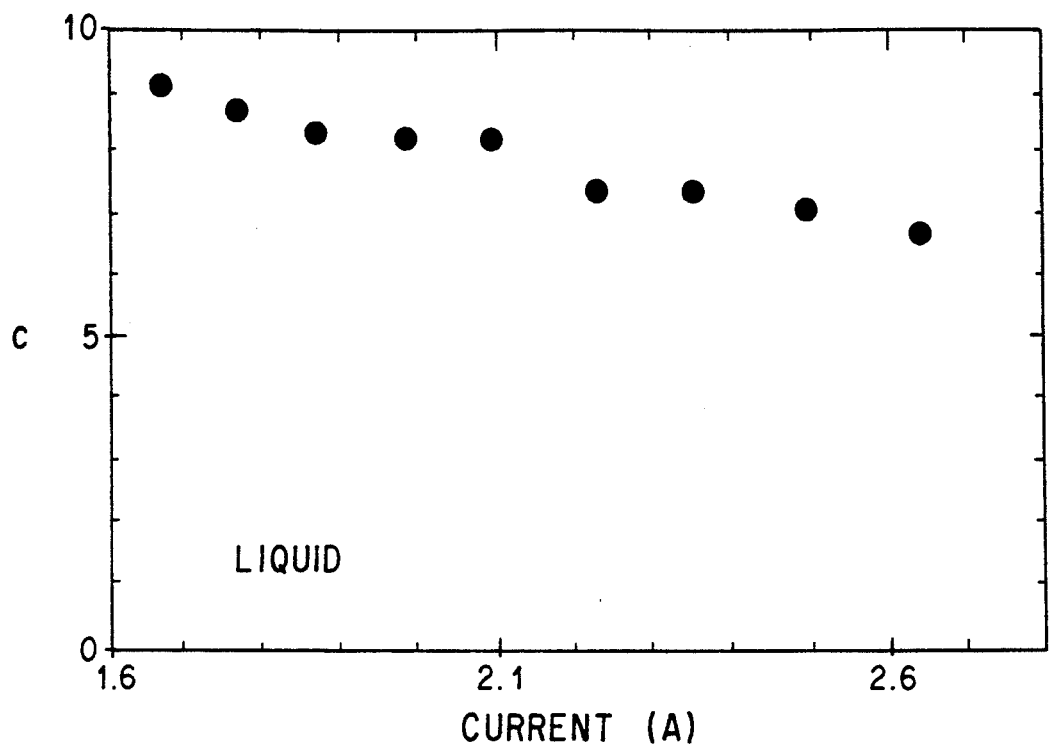
FIGS. 5a and 5b are plots of n as a function of sample current, as determined by the present invention.
Figure 5B:
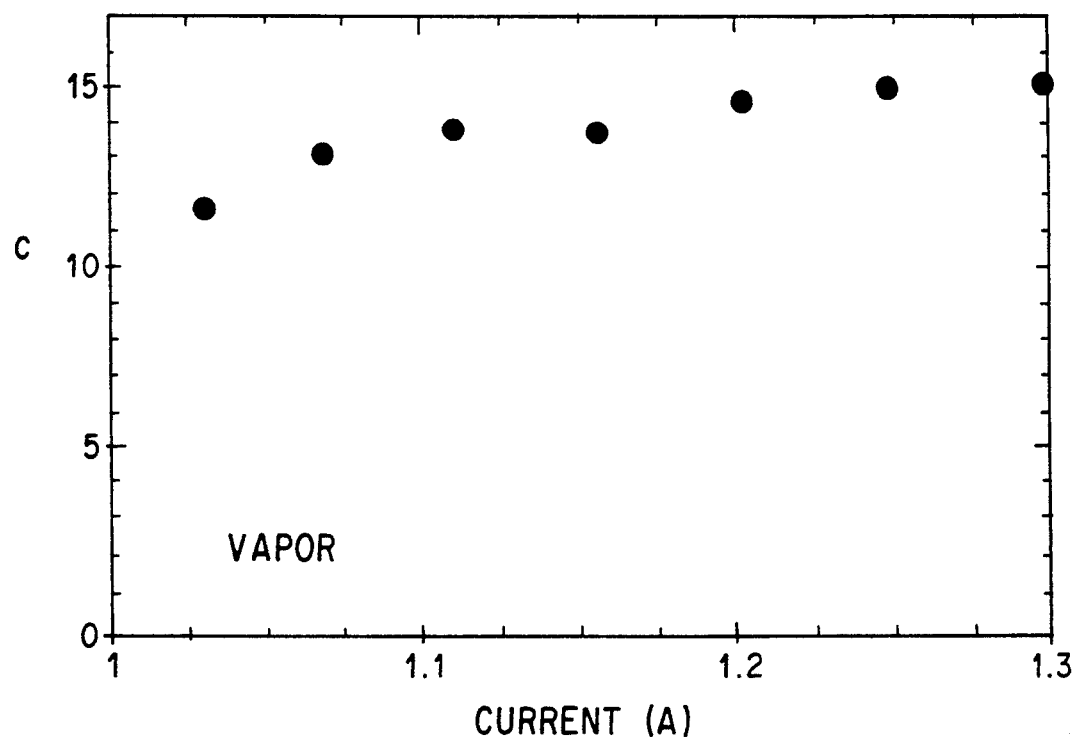

The sample was also evaluated using the more conventional dc procedure of measuring the voltage drop along the sample using a nanovoltmeter. The dc V-I curves are shown in FIG. 4. As in FIG. 2, there is a marked difference in the curves when liquid versus vapor nitrogen is employed. The critical current, based on a 10 μV/cm criterion, is 1.1 A in vapor and 1.8 A in liquid. The n values are shown in FIGS. 5a and 5b and are very different for liquid nitrogen and vapor nitrogen. The n values in FIGS. 5a and 5b were calculated numerically from the slope of three adjacent points in the log V versus I curve. These n values are close to those using the ac method described above at low currents.

As is clear from above, it is difficult to decide how to control a superconducting sensor to take full advantage of thermal effects on its V-I curves. Clearly, it is important to control the current flowing through the sample to avoid thermal runaway and damage to the sensor. Some of the options include controlling the current in order to keep either the voltage, $dV/dI$, or $d^2V/dI^2$ constant, at a level below thermal runaway, while measuring either the current or n to characterize the critical state of the sensor. The present inventors have found that the option of controlling the current to keep $dV/dI$ constant while measuring $d^2V/dI^2$ may also be employed but may be less precise because the difference between $d^2V/dI^2$ as a function of $dV/dI$ is small when the sample is in a liquid versus vapor thermal environment. The straight forward option is to control the current to keep the voltage constant while measuring the current to determine the critical state of the sample. The data of the sample shown above indicate that, at larger voltages approaching 500 μV (E=1 mV/cm), the current level changes from 1.4 A in vapor to 2.6 A in liquid, a factor of 1.9. At lower voltages the ratio is smaller. The problem with this approach is that for sensors made from thin film YBCO materials, typically having higher $J_c$ and n values, it is difficult to work at higher E field levels without thermal runaway.

The present invention focuses on controlling the current by keeping $dV/dI$ constant and measuring the quantity $(I \times d^2V/dI^2)/(dV/dI)$. In this manner, the n factor quantity will be strongly influenced by the thermal environment at low power levels in the sensor. See FIG. 6, which is data from FIGS. 3a and 3b replotted as $(I \times d^2V/dI^2)/(dV/dI)$ versus $dV/dI$. At low $dV/dI$, the n values are quite different, changing from 4 in the liquid to 14 in the vapor, a factor of 3.5.

An advantage of using harmonic detection schemes is that the n value can be measured instantaneously since $dV/dI$ and $d^2V/dI^2$ can be measured simultaneously in real time. This is in contrast to calculating the local slope of the log V versus I curve to get n or the local slope of the log $dV/dI$ versus I curve to get $n-1$ where several I-V points must be measured first precluding a real time measurement. Another important advantage of ac detection schemes is that thermal voltages generated along the voltage lead contacts do not affect the measurements in contrast to dc voltage detection using a nanovoltmeter. Applications such as a cold wire anemometer for measuring cryogenic flow where the temperature of the sample and the leads to the sample may be changing rapidly may best be suited to an ac detection scheme. The present invention may be utilized in low power cryogenic flow meters, bolometers, level detectors and other types of thermal environment sensors.

This strong coupling between the thermal properties of the surroundings and the width and nature of the transition can be exploited to allow sensitive measurement of heat transfer properties and thermal properties in general at relatively high speeds and with minimal heat input.

The second derivative is measured because it is an indicator of the non-linearity of the V vs. I curve. However, any parameter affected by the change of curvature or the degree of non-linearity may be used as a detection measurement in the present invention. For example, the harmonic content of the output waveform can also serve as the indicator. In the examples above, the second derivative was used as the detection parameter because it was the most direct and simple to detect with the equipment utilized. A Fourier transform of the output waveform, for example, would allow more sensitive detection. The present invention is in no way limited to the second derivative but can encompass any parameter which is indicative of the non-linearity of the V vs. I curve.

As discussed above, the present inventors have slowly ramped the dc current that travels through the specimen while simultaneously measuring the first and second derivative. The derivatives were measured by superimposing a small (10 mA) ac current on top of the dc specimen current. The ac component of the voltage appearing along the specimen is detected using a lock-in amplifier as described above.

In a simple application of the sensor, the current would be ramped until a set value of the first derivative is achieved. The current supply would then be placed in a feedback mode to maintain a constant first derivative. Any change in the second derivative would represent a change in the surrounding thermal properties alone because all other parameters are held nearly constant. The sensor output could be detected using other methods, but this is the most straightforward.

The present invention can be utilized in sensors such as level-detectors, bolometers and flow-meters. A level-detector detects conduction heat transfer. A flow-meter detects convection heat transfer. A bolometer detects radiative heat transfer. All such sensors within the present invention detect the heat transfer coefficient to its surroundings. Such sensors are effective in detecting all modes of heat transfer, including conductive, radiative and convective.

A flow meter would use the same detection electronics as described above. Such a sensor would be placed in the flow stream to measure the heat transfer coefficient between the sensor and the flowing fluid. This heat-transfer coefficient would vary directly with changes in the mass flow.

A bolometer rejects and absorbs heat by radiation instead of by conduction or convection. Such a sensor is used to detect the radiative properties of a distant object. Heat is transferred, by radiation, between the sensor and the object of interest. That is, a bolometer detects the temperature and emmittance of distant objects by measuring the heat transfer between itself and the distant object. Generally, a focused, coherent image is formed by a camera type arrangement. However, non-focused bolometer systems, such as flame detectors, can also be utilized.

Overall, the detection scene remains the same. All that changes is the geometry and environment of the sensor.

The example of the present invention above is essentially a level-detector, as would be clear to one skilled in the art, which differentiates between the properties of liquid nitrogen and vapor nitrogen.

Such a thermal environment sensor has many uses, such as those discussed above.

This invention may be embodied in other forms or carried out in other ways without departing from the spirit or essential characteristics thereof. This disclosure is therefore, to be considered as in all respects illustrative and not restrictive, the scope of the invention being indicated by the appended claims, and all changes which come within the meaning and range of equivalency are intended to be embraced therein.

What is claimed:

1. A method of thermal environment sensing comprising:
   a) supplying current to a sample from a current supply;
   b) ramping the current until a set value of a first derivative $dV/dI$ is achieved;
   c) placing the current supply in a feedback mode to maintain the first derivative constant;
   d) monitoring any changes in a parameter which is indicative of the non-linearity of the relationship between the voltage and the current, which indicate changes in the thermal environment of the sample.

2. A method of claim 1, wherein the sample is superconductive.

3. A method of claim 2, wherein the sample is $YBa_2Cu_3O_x$.

4. A method of claim 1, wherein the parameter is the second derivative $d^2V/dI^2$.

5. A method of claim 1, wherein the parameter is the harmonic content of the output waveform of the sample.

6. A method of thermal environment sensing comprising:
   a) supplying current to a sample from a current supply;
   b) ramping the current until a set value of a second derivative $d^2V/dI^2$ is achieved;

c) placing the current supply in a feedback mode to maintain the second derivative constant;

d) monitoring any changes in a parameter which is indicative of the non-linearity of the relationship between the voltage and the current, which indicate changes in the thermal environment of the sample.

7. A method of claim 6, wherein the sample is superconductive.

8. A method of claim 7, wherein the sample is $YBa_2Cu_3O_x$.

9. A method of claim 6, wherein the parameter is the first derivative $dV/dI$.

10. A method of claim 6, wherein the parameter is the harmonic content of the output waveform of the sample.

* * * * *